May 18, 1948.   U. C. TAINTON   2,441,776
PROCESS OF METAL COATING METAL ARTICLES
Original Filed Oct. 21, 1938   2 Sheets-Sheet 1
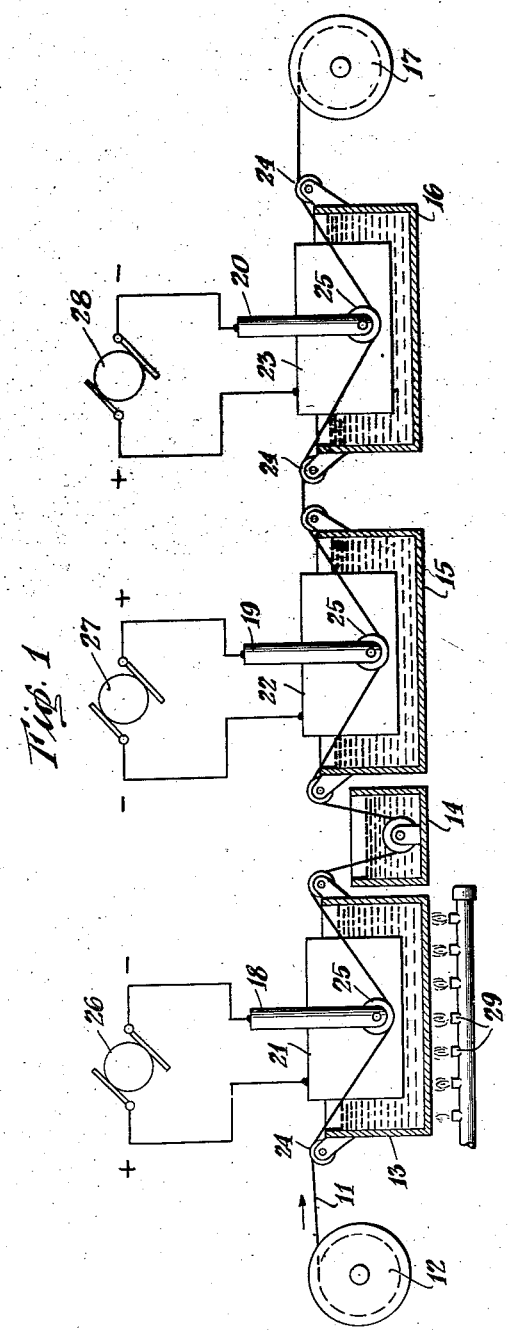
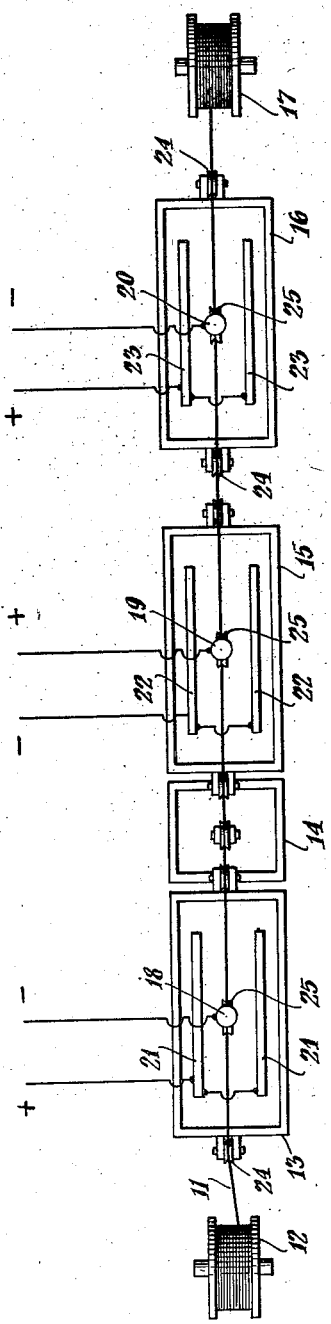
INVENTOR.
Arlyn C Tainton
BY
Edwards, Bower & Pool
ATTORNEYS

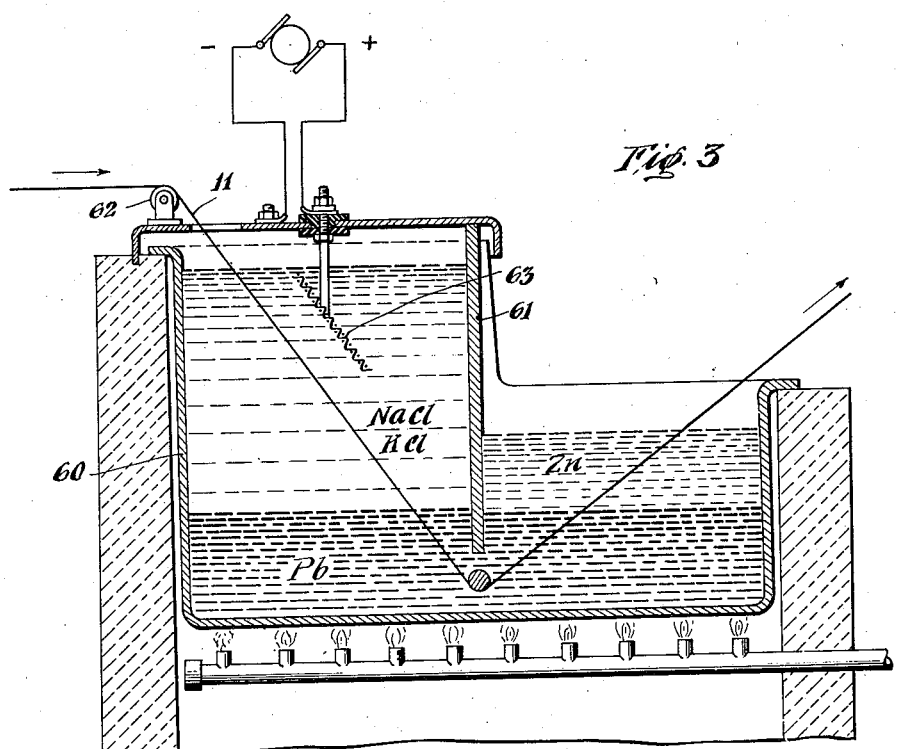

Patented May 18, 1948

2,441,776

UNITED STATES PATENT OFFICE 2,441,776

PROCESS OF METAL COATING METAL ARTICLES

Urlyn Clifton Tainton, Baltimore, Md.; Rolfe Pottberg administrator of U. C. Tainton, deceased, assignor to Freeport Sulphur Company, New York, N. Y., a corporation of Delaware Original application October 21, 1938, Serial No. 236,340. Divided and this application February 15, 1943, Serial No. 475,865

3 Claims. (Cl. 117—52)

My invention relates to the treatment of metal, particularly for the cleaning of the surface thereof. The invention is especially effective for removing rust, scale, carbon and slag from the surface of iron and steel, and is particularly applicable as a preliminary treatment to various coating operations, such as galvanizing, enameling, painting, electroplating or the like. The invention, however, as will later more fully appear, is not limited to the treatment of ferrous metal.

My invention comprises the step of subjecting the surfaces of metals to the reducing action of a metal more electropositive than the metal being treated, that is having a position in the electrochemical scale above that of the metal being treated. For example, when iron or steel is being treated it may be subjected to the action of sodium or calcium, which metals are considerably more electropositive than iron.

More specifically, my invention comprises the subjection of the metal article to be treated to the action of a more electropositive metal by a method in which the article is used as a cathode in a bath comprising compounds of the more electropositive metals, under such conditions that the more electropositive metal is liberated at the surface of the article.

In presenting this invention, a specific embodiment thereof will first be described, followed by illustrative modifications and an outline of the general principles upon which it rests.

Accordingly I shall first describe the cleaning of steel or iron wire as a step in the manufacture of electroplated zinc coated wire.

Referring to the drawings:

Fig. 1 is a diagrammatic elevation, more or less in section, of a system for cleaning and electroplating the wire;

Fig. 2 is a plan view of the system shown in Fig. 1; and

Fig. 3 is a diagrammatic longitudinal elevation of a system for cleaning wire and then galvanizing it by a "hot dip" operation.

Referring first to Figs. 1 and 2, the wire 11 is fed continuously from reel 12 successively through cleaning tank 13, wash tank 14, anodic cleaning tank 15, and electroplating tank 16, to reel 17. Electrodes 18, 19 and 20 depend into tanks 13, 15 and 16 which also contain electrodes 21, 22 and 23, respectively. The wire runs over guide rolls 24 mounted on the tanks, and over guide rolls 25 mounted at the ends of electrodes 18, 19 and 20. The electrodes of the several tanks are connected to electric current sources 26, 27 and 28, respectively, electrodes 18, 19 and 20 being respectively negative, positive, and negative, while electrodes 21, 22 and 23 are respectively positive, negative, and positive. Guide rolls 25 serve to conduct current to wire 11, the wire thus being rendered cathodic in tank 13, anodic in tank 15 and again cathodic in tank 16. Gas burners 29 are provided for maintaining tank 13 in a heated condition.

Tank 13 contains a fused bath of sodium hydroxide through which the wire passes. Current is passed through the fused bath to electrolyze it, the wire serving as the cathode. In this specific example of my invention, the wire passes through the bath at such a rate that each portion thereof remains immersed in the fused bath for a period of about thirty seconds and the current density employed is between 100 and 200 amperes per square foot of cathodic surface.

From tank 13 the wire passes through wash water in tank 14 to remove the adherent sodium hydroxide, thence passing through an aqueous solution of sulphuric acid in tank 15, the concentration of this being 20% $H_2SO_4$. Here the wire acts as the anode, the current density employed being of the order of 100 amperes per square foot or greater.

The wire next passes through an aqueous solution of zinc sulphate and sulphuric acid in tank 16, the zinc sulphate being in such an amount as to give a zinc content of 7 grams per 100 cubic centimeters of solution and the sulphuric acid about 20%. Here the wire acts as the cathode, the current density being of the order of 200 amperes or greater per square foot of cathodic surface. Here the wire is electroplated with zinc. For the anodic treatment in tank 15, the same composition may be employed as that in the coating of plating tank 16.

The treatment in tank 13 is the most significant stage of the process so far as this particular patent application is concerned. This treatment effectively cleans the surface of the wire, fully removing those obstacles to effective coating of ferrous metal. Moreover, this treatment produces a "passive" condition of the surface of the metal. This passivity of the metal surface gives it a considerable degree of resistance to corrosive influences.

Current densities in this sodium hydroxide-cathodic cleaning operation may vary over substantial ranges. However, sufficient current density and a sufficient period of time of the metal in the cleaning bath should ordinarily be employed to effect a substantially complete reduction of surface oxides while the metal is in the bath. Ordinarily the current density should be between 25 and 300 amperes per square foot of cathode surface. Most commonly the current is from 100 to 200 amperes per square foot of cathode surface.

For the most effective results, the electrolysis of the fused sodium hydroxide should be so carried out that the elemental sodium liberated does not collect in sensible amounts, preferably not in visible amounts, upon the article being treated and which article acts as cathode during the electrolysis. To effect this result I employ conditions during electrolysis such that the sodium as fast as it is separated from the sodium hydroxide, in the elemental state, is dissolved by or diffused into the bath of sodium hydroxide, and consequently does not gather or collect upon the surface of the article acting as cathode.

Under such conditions the sodium acts in two ways upon the oxides and other compounds on the article's surface: firstly, the sodium acts reducingly at the instant of its liberation from the sodium hydroxide, that is, it acts in its nascent condition; and secondly, the article is bathed by a solution of sodium in sodium hydroxide which acts reducingly upon any compounds on the article's surface.

The most easily imposed conditions for effecting the treatment with sodium without collecting sensible quantities of sodium on the surface of the article being treated is by the control of the temperature of the fused bath of sodium hydroxide. I maintain this fused bath at a temperature above that at which sodium collects upon the cathode. By keeping the bath at temperatures more than 20° C. in excess of the melting point of sodium hydroxide, the sodium is prevented from collecting on the cathode. At such temperatures the liberated sodium, which does not act immediately upon the compounds on the cathode surface, dissolves forthwith in the sodium hydroxide and thus the article being treated is surrounded with a highly reducing liquid which is exceedingly effective in rapidly reducing the compounds which may be upon the surface.

Preferably I employ the sodium hydroxide bath at a minimum temperature of 350° C. but, as implied above, I may go as low as a temperature just in excess of 20° above the melting point of the sodium hydroxide. Consequently I may use a temperature as low as just in excess of 338° C. in the case of pure sodium hydroxide. Since most commercial sodium hydroxides are more or less impure, their melting points are lower than that of the pure hydroxide, ordinarily ranging from about 295° C. to 300° C., consequently with these impure sodium hydroxides I may operate at somewhat lower temperatures, if desirable, namely at temperatures which are just in excess of 315° to 320° C.

High chromium steels, including the so-called "stainless steels" such as the well known "18–8" (18% chromium, and 8% nickel), are advantageously treated by my cleaning process. In treating these high chromium steels it is usually well to employ temperatures of the order of 538° C.

If, in the operation of the process given above as an example of my invention, the bath of sodium hydroxide is maintained at a temperature substantially above 550° C. the surface of the iron or steel becomes oxidized when it passes from the fused sodium hydroxide in tank 13 into the air. This condition can frequently be obviated by maintaining the fused bath of sodium hydroxide at a temperature below 550° C., at 500° C., for example. By using the cleaning bath at this temperature the oxidation of the treated metal is usually avoided by preventing at the outset the condition of the steel surface which leads to oxidation.

In carrying out the process above described, it may be useful in some cases to employ temperatures of the fused bath in excess of 550° C. It may be desired, for example, to effect an annealing of wire in the fused bath at a temperature say of 600° C. If such a temperature of the fused bath is employed in tank 13 the surface of the wire will oxidize when it enters the air. The oxides on the surface, thus produced, however, are not so closely adherent as those which normally occur on ferrous surfaces and they may easily be removed by a relatively mild pickling operation in an aqueous acid bath, such a pickling operation being much more easily and inexpensively carried out than if the metal had not previously been subjected to the fused bath treatment. Of course, when the article, after its treatment in the sodium hydroxide bath, is given a treatment such as the anodic treatment illustrated in Figs. 1 and 2, the oxides are effectively removed.

Steam directed along the surface of the wire as it issues from the bath seems to have an action in addition to that which it directly effects upon the wire as it issues from the fused bath, for instance, in blowing off considerable of the sodium hydroxide. It appears to modify somewhat the character of the bath with which it contacts in that it adds a small amount of $H_2O$ to the bath which combines with the oxidizing materials therein and thereby renders the exit portion of the bath relatively free from the tendency to furnish actively oxidizing materials to the wire or other metal article.

Other means for preventing the rapid oxidation of the metal as it leaves the fused cleaning bath may be employed. The oxygen in the air appears to be a factor in the reoxidation of the metal as it leaves the fused bath. By providing an atmosphere of a non-oxidizing gas, particularly one having a reducing action, reoxidation is substantially or entirely prevented.

My process is not limited in its application to sodium hydroxide. Other compounds of sodium may be used, or mixtures of different compounds. Nor is my process limited to the use of compounds of sodium. Compounds of the other alkali metals may be used, those of potassium being particularly suitable. I may also use compounds of the alkaline earth metal group including magnesium, those of calcium being economically advantageous. Hereafter, when referring generically to these various metals and their compounds, I shall usually designate them as "highly electropositive metals" or compounds thereof.

Not only with sodium hydroxide but with other compounds of sodium as well as compounds of the other metals of the alkali metal group the metals of the alkaline earth group, I prefer to operate at temperatures substantially above their melting points. I find that the reducing action of these highly electropositive metals is much more effective if the operating temperature of the bath is substantially in excess of the melting point of the compound or mixture of compounds which is used. Ordinarily the operating temperature of the bath should be in excess of twenty degrees above the melting point of the bath. By so proceeding, I find that I avoid the superficial reduction of compounds which may occur if lower temperatures are used, moreover the resulting reduced metal is much more easily detached than if the lower temperatures were to be used.

By selection of the proper compound for the fused bath or by a mixture of compounds, a wide variety of effects may be produced, thus enabling one to select the conditions most suitable for his particular material and problem. For example, if lower temperatures of operation, than those securable by the use of sodium hydroxide, are desired, such temperatures can be obtained by the use of compounds of lower melting points, such, for example, as sodium nitrite, (fusing at 213° C.), either alone or mixed with sodium hydroxide. By the judicious mixing of various sodium and potassium salts, as is well known, a rather wide range of fusion points may be secured.

In Fig. 3 I have illustrated diagrammatically an equipment for effecting my method of cleaning wire in conjunction with a "hot dip" galvanizing. A tank 60 is adapted to contain molten lead in its bottom portion. This tank is provided with a partition 61 which extends completely across the tank but terminates short of the bottom, its lower end extending well into the lead bath. The left hand compartment contains a molten bath of a mixture of sodium and potassium chloride and the right hand compartment contains molten zinc, both baths resting, obviously, on the bath of lead in the bottom of the tank. Wire 11 is fed continuously around rollers 62 first through the fused bath of sodium and potassium chloride, then through the lead in the bottom of the tank, and then through the galvanizing bath of zinc. A suitable mixture may consist of sixty parts of sodium chloride and forty parts of potassium chloride. Instead of the chlorides of these alkali metals, fluorides may be satisfactorily employed.

Arranged adjacent to the wire in the molten chloride are anodes 63, these anodes extending along the length of the wire. The wire is used as a cathode as in the preceding examples of my process. As will be readily apparent this mode of treatment avoids the chemical interaction of the zinc and the constituents of the fused bath and yet permits of the wire being taken into the coating medium without first passing into the air. Consequently even though the fused bath be operated at a temperature above 550° C., oxidation of the wire is largely or completely obviated. This process thus furnishes a further mode of avoidance of the tendency of the metal to be oxidized.

Usually in carrying out my cleaning operation it is important to maintain the fused bath relatively constant in composition or at least to allow variations only within definite limits. If there is undue variation in the composition of the fused bath the temperature will vary unduly. If, for example, sodium hydroxide is used for the bath undue formation of sodium carbonate through absorption from the air of carbon dioxide will lead to such an elevation of the melting point of the bath as to give bath temperatures too high for the most satisfactory operation of my process. Where, for instance, it is desired to operate the bath of sodium hydroxide at a temperature below 550° C. to prevent the ready oxidability of the metal, it is necessary that means be provided to prevent the absorption of such an amount of carbon dioxide as will raise the melting point above the desired operating temperature. The carbonate content of the fused bath will of course depend upon the rate of removal of the mixture of sodium hydroxide and sodium carbonate upon the surface of the metal being treated, the rate of replenishment of the fused bath by the addition of pure sodium hydroxide, and the rate of absorption of carbon dioxide. The most effective way of keeping the carbon dioxide absorption at the necessary minimum is by providing a cover for the fused bath cleaning tank.

The loss of sodium hydroxide, or other bath constituent, from the fused bath, due to its being carried away on the surface of the article treated, may be minimized in various ways as by wiping the wire or other article as it issued from the bath.

I have already indicated, in my description of the use of a fused bath of sodium hydroxide, that I prefer to operate the bath under such conditions that I obtain the conjoint action of sodium in the nascent state and sodium dissolved in the sodium hydroxide. The solution of the reducing metal is a highly important feature of my invention. A consequence of its presence is that reduction of oxides and other compounds is not limited to those portions of the article's surface which are acting efficiently as cathode. For example, the oxides on both sides of an article are reduced even when but one side of such article acts as cathode. The importance of this action of the solution of highly electropositive metal is obvious. Many articles to be cleaned are of such shape that it is practically impossible for all parts of their surface to act efficiently as cathode surfaces, as, for example, articles of a tubular construction, those which are deeply recessed, and the like. As a result of the article being surrounded by a solution of the reducing metal, all portions of the article's surface can be effectively treated.

I am able to reduce oxides, and other compounds, effectively even when the article being treated does not act as cathode. By producing a solution of the highly electro-positive metal instead of collecting it upon the cathode, as already pointed out, an article in the fused bath may be subjected to the reducing action of the solution even though such article is in no way electrically connected with the cathode.

Accordingly, my invention, in its broader aspect, includes the idea of subjecting metal articles to a solution of highly electro-positive metal in a fused bath. For example, articles having highly oxidized surfaces may be effectively cleaned by immersing them for a substantial time in a solution of sodium in fused sodium hydroxide, regardless of how the solution is prepared, whether electrolytically or otherwise. The solution obviously may be prepared in various ways. Elemental sodium may be gradually added to a fused bath of sodium hydroxide in any manner desired. Probably the most effective way to maintain a solution of sodium in the hydroxide is by introducing it in the manner already pointed out, namely by electrolyzing a solution of sodium hydroxide at a sufficiently elevated temperature to cause the liberated sodium to diffuse into the fused bath.

My process is not limited to the treatment of ferrous metals. Articles of various metals may be efficiently cleaned by subjecting them to the action of metals having a greater affinity for oxygen than the metal being treated.

For example, I have effectively cleaned articles of copper, bronze, and nickel-chromium alloys by using them as cathodes in the electrolysis of a fused bath of sodium hydroxide. It will be readily appreciated that the essential principles of this invention may be applied to metals generally, varying, as desired and as special conditions demand, the details of the operation.

Various modifications in my process are feasible. For example, it is practicable to produce alloy surfaces on an article at the same time it is treated to reduce oxides and other reducible compounds. For instance, it is possible to give copper a zinc-copper alloy surface by subjecting the copper as cathode to electrolysis in a fused bath of sodium hydroxide in which zinc oxide is dissolved, the copper not only being cleaned but the zinc being deposited to alloy with the surface of the copper. Similarly, the copper may be provided with a surface of a copper-tin alloy by subjecting the copper as cathode to electrolysis in a fused bath of sodium hydroxide in which tin oxide has been dissolved. Lead may be deposited upon ferrous surfaces if a lead compound is present in the fused bath.

A further means of reducing or overcoming the tendency to reoxidation is to reduce the current density just before the article leaves the bath. For example, if wire is being treated in a caustic soda bath and a current density of 100 amperes per square foot of cathode surface is being employed to clean the surface, the current density may be reduced to 10 amperes or less per square foot of cathode surface just before the wire leaves the fused bath.

The treatment of the article either electrolytically or without current accomplishes the deoxidation of the oxides, scale and the like within the bath, and it is understood that the treatment without current may be preceded by and followed by the electrolytic and oxide-preventing treatments, as described in connection with the electrolytic deoxidation and that the treated material may be brought out through subsequent fused baths as illustrated, for instance, in Fig. 3 with a corresponding coating of the surface of the article.

This application is a division of my co-pending application Serial No. 236,340, filed October 21, 1938, now Patent No. 2,311,139, which application is in part a continuation of application Serial No. 630,233, filed August 24, 1932, application Serial No. 692,378, filed October 6, 1933, and application Serial No. 128,682, filed March 2, 1937, now Patent No. 2,134,457, dated October 25, 1938.

I claim:

1. In a process for treating a metal article to remove oxides, scale and the like, the steps of providing a bath of a molten compound of a metal from the group consisting of the alkali and alkali earth metals and containing in solution a metal also from said group and electropositive relative to the treated metal of the article, introducing said article into said bath, maintaining said bath at a temperature below the boiling point of said treating metal and sufficiently high above the fusion point of the molten compound to maintain said supplied metal in solution in said bath at the area of contact with said article whereby to avoid a deposit of said treating metal on said article, continuing said treatment for a sufficient length of time with sufficient treating metal in solution to complete reduction of the oxides, scale and the like in the bath without accumulation of a deposit of said treating metal on the article, passing said treated metal article free of deposit of said treating metal into a contiguous bath of an inert, relatively non-coating metal, and then passing said treated metal article into a contiguous bath of a molten coating metal substantially free of said alkali metal and accumulating said coating metal in direct contact with the surface of the article.

2. The process of treating a metal article to remove oxides, scale and the like comprising the steps of placing said article in circuit directly connected to an electro-negative source and subjecting it to electrolysis as a cathode in a molten bath of a compound of a metal of the group consisting of alkali and alkali earth metals adapted to be liberated at the surface of the cathode in said electrolysis, and subjecting the article to the action of said molten bath of the compound at a temperature below the boiling point of the liberated metal and sufficiently in excess of the fusion point of the molten compound to dissolve the liberated metal in said bath and avoid a deposit of said metal on said article, maintaining said treatment for a sufficient time to completely reduce oxides, scale and the like while the article is in the bath and then delivering said treated article from said molten bath free of any sensible deposit of said dissolved metal through a contiguous bath of a molten, inert, relatively non-coating metal to a contiguous bath of a molten coating metal substantially free of said liberated metal and accumulating as a deposit in direct contact with the surface of said article.

3. In a process for treating a metal article to remove oxides, scale and the like, the steps of providing a bath of a molten compound of a metal from the group consisting of sodium, calcium, potassium and magnesium and containing in solution metallic sodium, introducing said article into said bath, maintaining said bath at a temperature between 315° C. and 600° C. and sufficiently in excess of the diffusion point of the molten compound to dissolve the sodium in said bath and avoid a deposit of sodium on said article, continuing said treatment for a sufficient length of time with sufficient sodium metal in solution to complete the reduction of the oxides, scale and the like in the bath without accumulation of said sodium metal on the article, passing said treated metal article free of sodium into a contiguous bath of molten lead and then passing said treated metal article into a contiguous molten bath of molten zinc substantially free of sodium and accumulating as a deposit in direct contact with the surface of said article.

URLYN CLIFTON TAINTON.

REFERENCES CITED

The following references are of record in the file of this patent:

UNITED STATES PATENTS

| Number | Name | Date |
| --- | --- | --- |
| 781,230 | Rodman | Jan. 31, 1905 |
| 800,984 | Chance | Oct. 3, 1905 |
| 1,114,635 | Nelson | Oct. 20, 1914 |
| 1,276,977 | Shoemaker | Aug. 27, 1918 |
| 1,330,399 | Shoemaker | Feb. 10, 1920 |
| 1,378,052 | Peacock | May 17, 1921 |
| 1,545,305 | Carpo et al. | July 7, 1925 |
| 1,741,388 | Wehr et al. | Dec. 31, 1929 |
| 1,942,121 | Patter | Jan. 2, 1934 |
| 2,134,457 | Tainton | Oct. 25, 1938 |
| 2,172,933 | Daesen et al. | Sept. 12, 1939 |
| 2,261,744 | Ostrofsky | Nov. 4, 1941 |
| 2,311,099 | Tainton | Feb. 16, 1943 |
| 2,311,139 | Tainton | Feb. 16, 1943 |

FOREIGN PATENTS

| Number | Country | Date |
| --- | --- | --- |
| 203 | Great Britain | 1857 |
| 386 | Great Britain | 1857 |
| 257,262 | Great Britain | 1927 |